(12) United States Patent
Hud et al.

(10) Patent No.: US 11,760,384 B2
(45) Date of Patent: Sep. 19, 2023

(54) METHODS AND SYSTEMS FOR DETERMINING TRAJECTORY ESTIMATION ORDER FOR VEHICLES

(71) Applicant: YANDEX SELF DRIVING GROUP LLC, Skolkovo (RU)

(72) Inventors: Pavel Sergeevich Hud, Minsk (BY); Victor Igorevich Otliga, Minsk (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 350 days.

(21) Appl. No.: 16/852,060

(22) Filed: Apr. 17, 2020

(65) Prior Publication Data

US 2020/0339158 A1 Oct. 29, 2020

(30) Foreign Application Priority Data

Apr. 25, 2019 (RU) .......................... RU2019112788

(51) Int. Cl.
*B60W 60/00* (2020.01)
*G08G 1/01* (2006.01)
(Continued)

(52) U.S. Cl.
CPC .... *B60W 60/0027* (2020.02); *B60W 60/0011* (2020.02); *G06N 20/00* (2019.01);
(Continued)

(58) Field of Classification Search
None
See application file for complete search history.

(56) References Cited

U.S. PATENT DOCUMENTS 8,112,225 B2  2/2012 Eidehall et al.
8,457,827 B1  6/2013 Ferguson et al.
(Continued)

FOREIGN PATENT DOCUMENTS

CN    105739534 A    7/2016
CN    105469599 B    12/2017
(Continued)

OTHER PUBLICATIONS

Bijoyan Das, "Flowchart Tutorials 1: Introduction" Youtube, Oct. 17, 2016 (Year: 2016).*

(Continued)

*Primary Examiner* — James J Lee
*Assistant Examiner* — David Hatch
(74) *Attorney, Agent, or Firm* — BCF LLP

(57) ABSTRACT

A method of and processor for determining a trajectory estimation order for vehicles are disclosed. The processor has access to a section of a road map corresponding to surroundings of the one of the vehicles, and road rules associated therewith. The method includes identifying pairs of vehicles that have intersecting potential trajectories and vehicle priority information indicative of priorities of vehicles on the section of the road map. Based on the vehicle priority information, the method includes determining a trajectory estimation order for vehicles on the section of the road map, such that a given vehicle having priority over another vehicle in the vehicle priority information is above another vehicle in the trajectory estimation order.

17 Claims, 6 Drawing Sheets

(51) Int. Cl.
  *G06V 20/56* (2022.01)
  *G06N 20/00* (2019.01)
(52) U.S. Cl.
  CPC ........... *G06V 20/56* (2022.01); *G08G 1/0125* (2013.01); *G08G 1/0145* (2013.01)

(56) References Cited

U.S. PATENT DOCUMENTS

| | | | |
|---|---|---|---|
| 8,903,588 | B2 | 12/2014 | Schmuedderich et al. |
| 9,463,797 | B2 | 10/2016 | Damerow et al. |
| 9,511,767 | B1 | 12/2016 | Okumura et al. |
| 9,528,838 | B2 | 12/2016 | Okumura et al. |
| 9,552,503 | B2 | 1/2017 | Bruemmer et al. |
| 9,645,577 | B1 * | 5/2017 | Frazzoli ................ B60W 30/00 |
| 9,669,827 | B1 | 6/2017 | Ferguson et al. |
| 9,672,446 | B1 | 6/2017 | Vallespi-Gonzalez |
| 9,766,626 | B1 | 9/2017 | Zhu et al. |
| 9,818,299 | B1 * | 11/2017 | Jammoussi ........ G08G 1/09626 |
| 10,216,189 | B1 * | 2/2019 | Haynes ............... B60W 30/095 |
| 11,055,997 | B1 * | 7/2021 | Bai ...................... G08G 1/0145 |
| 11,110,922 | B2 * | 9/2021 | Beller ............ B60W 60/00272 |
| 2009/0109061 | A1 * | 4/2009 | McNew ................. G08G 1/164 340/928 |
| 2013/0018572 | A1 | 1/2013 | Jang et al. |
| 2014/0278029 | A1 * | 9/2014 | Tonguz .................. G08G 1/161 701/117 |
| 2017/0190334 | A1 | 7/2017 | Zelman et al. |
| 2017/0301233 | A1 | 10/2017 | Witt et al. |
| 2018/0173240 | A1 | 6/2018 | Fang et al. |
| 2018/0239358 | A1 | 8/2018 | Choi et al. |
| 2018/0239361 | A1 | 8/2018 | Micks et al. |

FOREIGN PATENT DOCUMENTS

| | | |
|---|---|---|
| CN | 105718750 B | 8/2018 |
| DE | 102016007899 A1 | 12/2017 |
| GB | 2557426 A | 6/2018 |
| RU | 2638879 C2 | 12/2017 |

OTHER PUBLICATIONS

MC. Conor, "Machine learning fundamentals (I): cost functions and gradient descent", Towards data science, Nov. 27, 2017 (Year: 2017).*

Liting et al., "Probabilistic Prediction of Interactive Driving Behavior via Hierarchical Inverse Reinforcement Learning", Sep. 9, 2018, Cornell University, arXiv:1809.02926.

Yeping et al., "A Framework for Probabilistic Generic Traffic Scene Prediction", 2018 IEEE 21st International Conference on Intelligent Transportation Systems (ITSC), Submitted on Oct. 30, 2018, Cornell University. arXiv:1810.12506.

European Search Report dated Oct. 7, 2020 issued in respect of the related European Patent Application No. 20171433.4.

Russian Search Report dated Apr. 2, 2021 issued in respect of the counterpart Russian Patent Application No. RU 2019112788.

* cited by examiner

METHODS AND SYSTEMS FOR DETERMINING TRAJECTORY ESTIMATION ORDER FOR VEHICLES

CROSS-REFERENCE

The present application claims priority to Russian Patent Application No. 2019112788, entitled "Methods and Systems for Determining Trajectory Estimation Order for Vehicles", filed Apr. 25, 2019, the entirety of which is incorporated herein by reference.

FIELD OF TECHNOLOGY

The present technology relates to computer-implemented methods and systems for computer-assisted driving, and more specifically, to methods and systems for determining a trajectory estimation order for vehicles.

BACKGROUND

Fully or highly automated driving systems may be designed to operate a vehicle on the road without driver interaction (e.g., driverless mode) or other external control. For instance, self-driving vehicles and/or autonomous vehicles are designed to operate a vehicle in a computer-assisted manner.

An autonomous vehicle is configured to traverse a planned path between its current position and a target future position without (or with minimal) input from the driver. Nearby/neighboring vehicles can travel along paths or trajectories that can intersect with the planned trajectory of the autonomous vehicle. This is especially true when the autonomous vehicle approaches an intersection.

Some systems are able to generate a planned trajectory for an autonomous vehicle for navigating through an intersection. However, in order to operate safely and efficiently at an intersection or elsewhere on the road, computer systems should take into account priorities of nearby/neighboring vehicles for decision making.

SUMMARY

Developers of the present technology have realized that prior art solutions have drawbacks.

At least one potential advantage of the present technology may become apparent in view of the present disclosure and with reference to a scenario depicted on FIG. 5. There is depicted a visual representation 500 of a given section of the road map. Also, there is depicted (i) a visual representation 520 corresponding to a first autonomous vehicle, and (ii) a visual representation 530 corresponding to a second autonomous vehicle. In this scenario, a road on the another section of the road map has a pair of lanes that are merging into a single lane. As such, the decision making process of each of the first autonomous vehicle and the second autonomous vehicle may include the determination of which one should proceed first and which one should give way.

The developers of the present technology have realized that autonomous vehicles have a tendency, by design, to be risk averse for promoting safety on the roads. As such, although in accordance with the road rules the first autonomous vehicle has priority (right of way) over the second autonomous vehicle, the first autonomous vehicle may still decide to give way to the second autonomous vehicle due to the very close proximity of the second autonomous vehicle. By the same token, due to the risk averse tendencies of autonomous vehicles, the second autonomous vehicle may also decide to give way to the first autonomous vehicle.

Hence, in this scenario, the developers of the present technology realized that a pair of autonomous vehicles, due to their tendency of being risk averse, may begin to both slow down for trying to give way to the other one.

In order to avoid similar interactions amongst pairs of autonomous vehicles, the developers of the present technology have designed systems that are able to determine a trajectory estimation order as disclosed herein that, if implemented by both autonomous vehicles, will result in both autonomous vehicles determining a same trajectory estimation order. It should be noted that, it is not important which one of the first autonomous vehicle and the second autonomous vehicle will have his estimated trajectory dependent on the other one (based on that same trajectory estimation order). What is important however is that due to having determined the same trajectory estimation order, the dependency of the estimated trajectories will be determined in the same manner by both autonomous vehicles and as such, only one of the autonomous vehicles will decide to give way while the other one will decide to proceed first.

In accordance with a first broad aspect of the present technology, there is provided a method of determining a trajectory estimation order for vehicles. One of the vehicles is communicatively coupled to a processor. The processor has access to information indicative of: a section of a road map corresponding to surroundings of the one of the vehicles, and road rules associated with the section of the road map. The method is executable by the processor. The method comprises identifying, by the processor, pairs of vehicles on the section of the road map that have intersecting potential trajectories. The method comprises identifying, by the processor, vehicle priority information indicative of priorities of vehicles on the section of the road map. The identifying comprises using, by the processor, the road rules for determining which one in a respective pair of vehicles has priority over the other one in the respective pair of vehicles. The method comprises, based on the vehicle priority information, determining, by the processor, a trajectory estimation order for vehicles on the section of the road map, such that a given vehicle having priority over another vehicle in the vehicle priority information is above another vehicle in the trajectory estimation order.

In some embodiments of the method, the method further comprises using, by the processor, the trajectory estimation order for determining estimated trajectories of vehicles on the section of the road map, such that: (i) at least one estimated trajectory of the given vehicle is determined prior to determining at least one estimated trajectory of the another vehicle, and (ii) the at least one estimated trajectory of the another vehicle is determined based on the at least one estimated trajectory of the given vehicle.

In some embodiments of the method, the identifying the vehicle priority information comprises generating, by the processor, a graph structure having vertices and edges. A given edge connects a pair of vertices. The pair of vertices is indicative of a respective pair of vehicles on the section of the road map. The given edge represents which one of a first one in the respective pair of vehicles has priority over a second one in the respective pair of vehicles.

In some embodiments of the method, the method further comprises using, by the processor, estimated trajectories of the vehicles on the section of the road map for determining a target trajectory of the one of the vehicles.

In some embodiments of the method, the using the estimated trajectories comprises inputting, by the processor, the estimated trajectories of the vehicles into a Machine Learned Algorithm (MLA). The MLA is configured to employ at least the estimated trajectories of the vehicles for outputting the target trajectory of the one of the vehicles.

In some embodiments of the method, the MLA is further configured to employ kinematic data about at least one of the vehicles for outputting the target trajectory of the one of the vehicles.

In some embodiments of the method, the kinematic data comprises at least one of: position of the at least one of the vehicles; speed of the at least one of the vehicles; and acceleration of the at least one of the vehicles.

In some embodiments of the method, the kinematic data is gathered by a sensor system communicatively coupled to the one of the vehicles.

In some embodiments of the method, the processor further has access to information indicative of positions of the vehicles on the section of the road map.

In some embodiments of the method, the information indicative of the positions is gathered by a sensor system communicatively coupled to the one of the vehicles.

In some embodiments of the method, the one of the vehicles is equipped with the sensor system.

In some embodiments of the method, the graph structure is a hierarchical structure representing a priority-based hierarchy between the vehicles and having on top thereof a main vehicle. The main vehicle is a least affected vehicle by the vehicles in the priority-based hierarchy than any other vehicle in the priority-based hierarchy.

In some embodiments of the method, the identifying the vehicle priority information comprises generating a plurality of graph structures. The plurality of graph structures comprises a plurality of hierarchical structures each representing a respective priority-based hierarchy between respective vehicles. Each hierarchical structure has on top thereof a respective main vehicle. The respective main vehicle is a least affected vehicle by the vehicles in the respectively associated priority-based hierarchy than any other vehicle in the respectively associated priority-based hierarchy.

In some embodiments of the method, the trajectory estimation order for a given priority-based hierarchy starts with the respective main vehicle.

In some embodiments of the method, to determine the at least one estimated trajectory for the one of the vehicles, the method further comprises generating the at least one estimated trajectories of vehicles that are above the one of the vehicles in the order, and starting with the respective main vehicle and going down the order.

In some embodiments of the method, the method comprises not determining the at least one estimated trajectory for vehicles below the one of the vehicle in the order.

In some embodiments of the method, the one of the vehicles and another vehicle are autonomous vehicles.

In some embodiments of the method, the method further comprises transmitting information indicative of the trajectory estimation order to the another vehicle.

In some embodiments of the method, the one of the vehicles has access to kinematic data about at least one of the vehicles, and the method further comprises transmitting the kinematic data to the another vehicle.

In some embodiments of the method, the one of the vehicles has access to object-related information about objects on the section of the road map, and the method further comprises transmitting the object-related information to the another vehicle.

In some embodiments of the method, the method further comprises determining a target trajectory for the one of the vehicles, and transmitting information indicative of the target trajectory to the another vehicle.

In a second broad aspect of the present technology, there is provided a processor for determining a trajectory estimation order for vehicles. One of the vehicles is communicatively coupled to the processor. The processor has access to information indicative of: a section of a road map corresponding to surroundings of the one of the vehicles, and road rules associated with the section of the road map. The processor is configured to identify pairs of vehicles on the section of the road map that have intersecting potential trajectories. The processor is configured to identify vehicle priority information indicative of priorities of vehicles on the section of the road map. To identify vehicle priority information the processor is configured to use the road rules for determining which one in a respective pair of vehicles has priority over the other one in the respective pair of vehicles. The processor is configured to, based on the vehicle priority information, determine trajectory estimation order for vehicles on the section of the road map, such that a given vehicle having priority over another vehicle in the vehicle priority information is above another vehicle in the trajectory estimation order.

In some embodiments of the processor, the processor is a hardware-based processor.

In some embodiments of the processor, the processor is further configured to use the trajectory estimation order for determining estimated trajectories of vehicles on the section of the road map, such that: (i) at least one estimated trajectory of the given vehicle is determined prior to determining at least one estimated trajectory of the another vehicle, and (ii) the at least one estimated trajectory of the another vehicle is determined based on the at least one estimated trajectory of the given vehicle.

In some embodiments of the processor, the processor configured to identify the vehicle priority information comprises the processor being configured to generate a graph structure having vertices and edges. A given edge connects a pair of vertices. The pair of vertices is indicative of a respective pair of vehicles on the section of the road map. The given edge represents which one of a first one in the respective pair of vehicles has priority over a second one in the respective pair of vehicles.

In some embodiments of the processor, the processor is further configured to use estimated trajectories of the vehicles on the section of the road map for determining a target trajectory of the one of the vehicles.

In some embodiments of the processor, the processor configured to use the estimated trajectories comprises the processor configured to input the estimated trajectories of the vehicles into a Machine Learned Algorithm (MLA). The MLA is configured to employ at least the estimated trajectories of the vehicles for outputting the target trajectory of the one of the vehicles.

In some embodiments of the processor, the MLA is further configured to employ kinematic data about at least one of the vehicles for outputting the target trajectory of the one of the vehicles.

In some embodiments of the processor, the kinematic data comprises at least one of: position of the at least one of the vehicles, speed of the at least one of the vehicles, and acceleration of the at least one of the vehicles.

In some embodiments of the processor, the kinematic data is gathered by a sensor system communicatively coupled to the one of the vehicles.

In some embodiments of the processor, the processor further has access to information indicative of positions of the vehicles on the section of the road map.

In some embodiments of the processor, the information indicative of the positions is gathered by a sensor system communicatively coupled to the one of the vehicles.

In some embodiments of the processor, the one of the vehicles is equipped with the sensor system.

In some embodiments of the processor, the graph structure is a hierarchical structure representing a priority-based hierarchy between the vehicles having on top thereof a main vehicle. The main vehicle is a least affected vehicle by the vehicles in the priority-based hierarchy than any other vehicle in the priority-based hierarchy.

In some embodiments of the processor, the processor configured to identify the vehicle priority information comprises the processor configured to generate a plurality of graph structures. The plurality of graph structures comprises a plurality of hierarchical structures each representing a respective priority-based hierarchy between respective vehicles. Each hierarchical structure has on top thereof a respective main vehicle. The respective main vehicle is a least affected vehicle by the vehicles in the respectively associated priority-based hierarchy than any other vehicle in the respectively associated priority-based hierarchy.

In some embodiments of the processor, the trajectory estimation order for a given priority-based hierarchy starts with the respective main vehicle.

In some embodiments of the processor, the processor is configured to determine the at least one estimated trajectory for the one of the vehicles. The processor is further configured to generate the at least one estimated trajectories of vehicles that are above the one of the vehicles in the order, and starting with the respective main vehicle and going down the order.

In some embodiments of the processor, the processor is further configured not to determine the at least one estimated trajectory for vehicles below the one of the vehicle in the order.

In some embodiments of the processor, the one of the vehicles and another vehicle are autonomous vehicles.

In some embodiments of the processor, the processor is further configured to transmit information indicative of the trajectory estimation order to the another vehicle.

In some embodiments of the processor, the one of the vehicles has access to kinematic data about at least one of the vehicles, and the processor is further configured to transmit the kinematic data to the another vehicle.

In some embodiments of the processor, the one of the vehicles has access to object-related information about objects on the section of the road map, and the processor is further configured to transmit the object-related information to the another vehicle.

In some embodiments of the processor, the processor is configured to determine a target trajectory for the one of the vehicles, and transmit information indicative of the target trajectory to the another vehicle.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
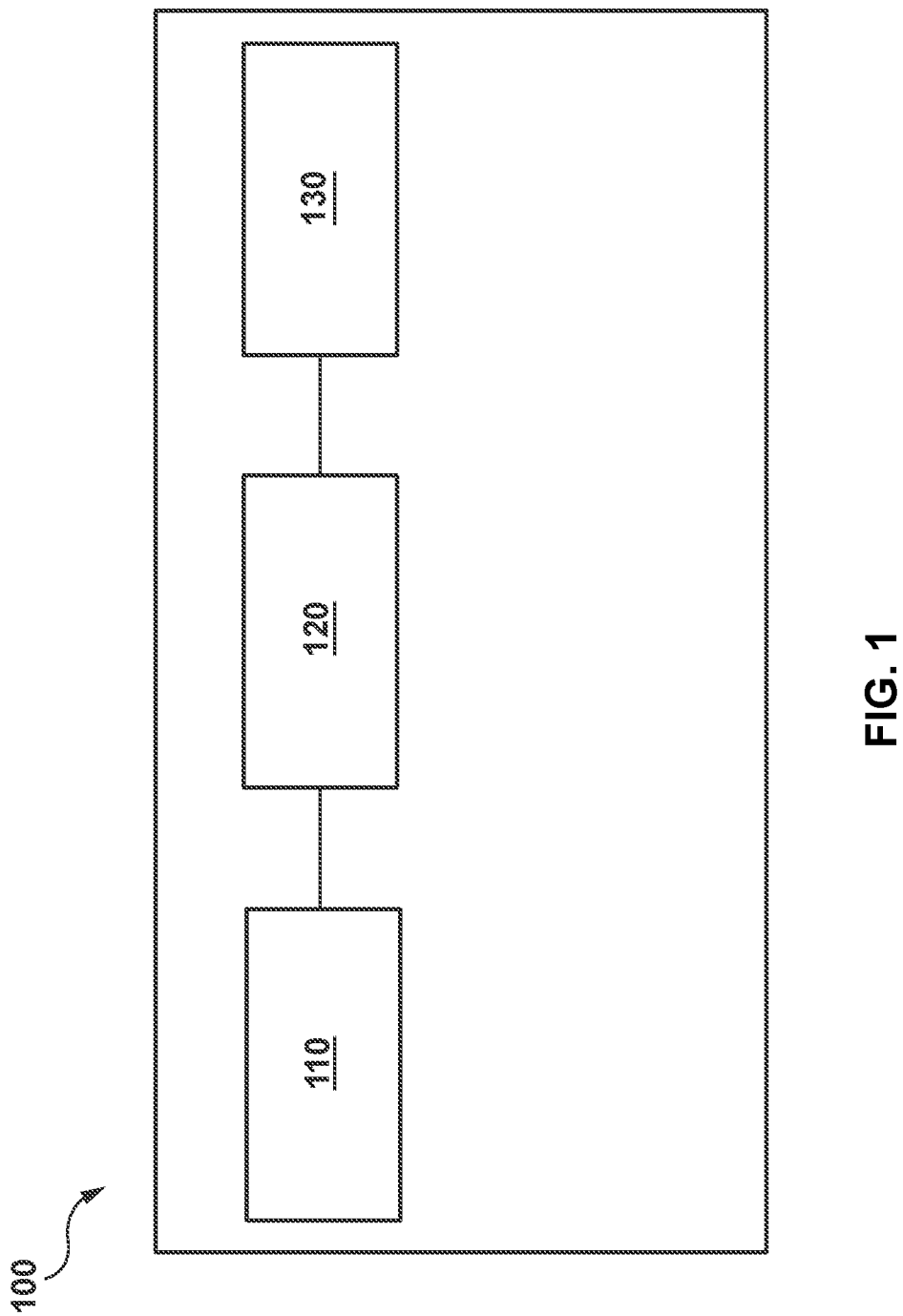
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by a processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for a variety of processing tasked. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
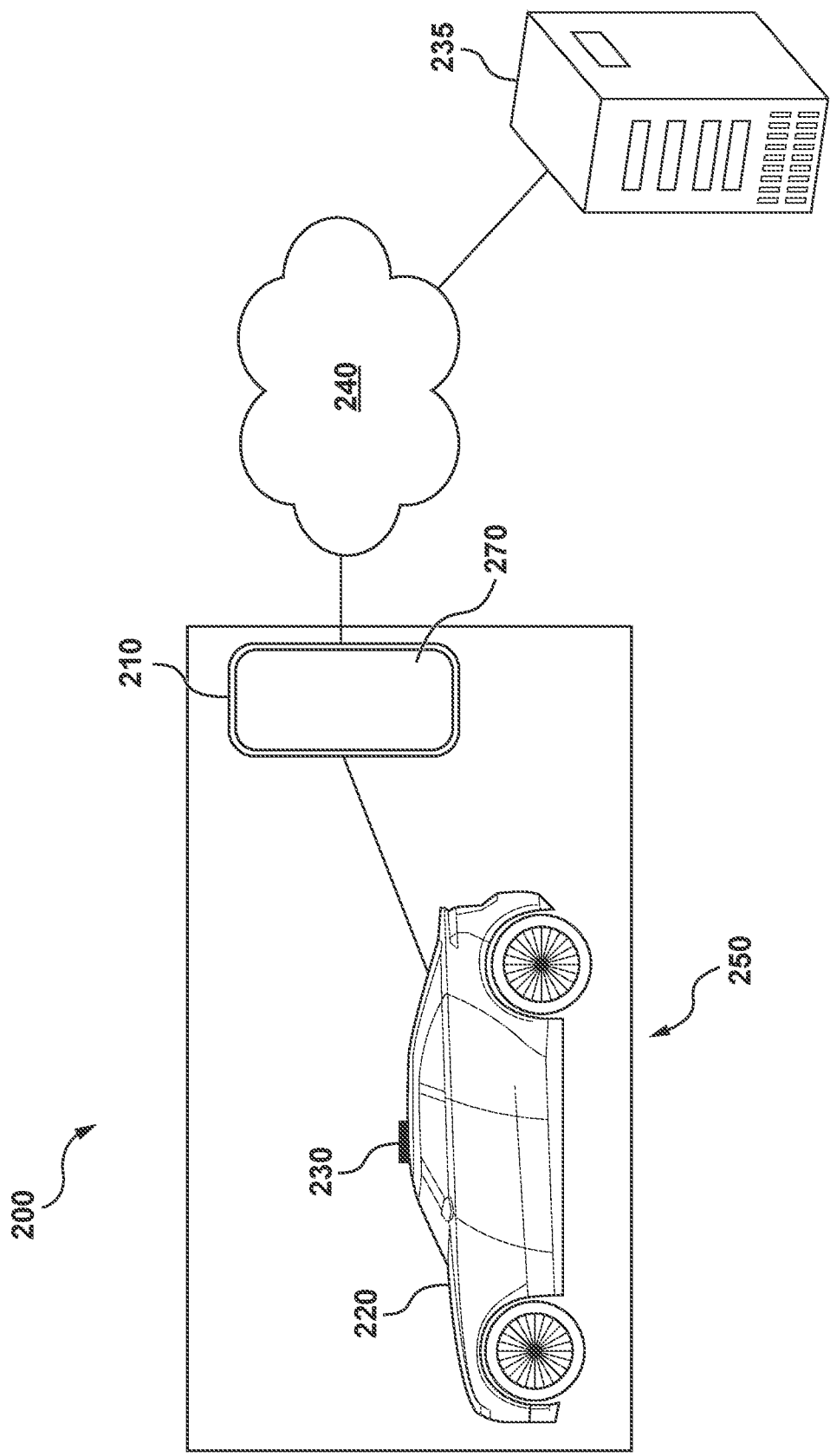
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who can operate the vehicle 220, a server 235 in communication with the electronic device 210 via a communication network 245 (e.g. the Internet or the like, as will be described in greater detail herein below).

Optionally, the networked computer environment 200 can also include one or more satellites (not depicted) transmitting and/or receiving a GPS signal to/from the electronic device 210. It will be understood that the present technology is not limited to GPS and may employ a positioning technology other than GPS. It should be noted that the one or more satellites may be omitted in at least some embodiments of the present technology.

The vehicle 220, to which the electronic device 210 is associated, may comprise any leisure or transportation vehicle such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated, a driver-less vehicle, or any other vehicle configured to be operated in a computer-assisted manner. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for processing data as will be described in greater detail below.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In some embodiments of the present technology, the server 235 may have access (locally and/or remotely) to information indicative to a road map. Broadly speaking, the road map is a map of roads that are located in a city, a state, and/or other areas. For example, a section of the road map may include information such as, but not limited to: presence of roads in that section, number of lanes on these roads, presence of intersections, and the like.

In other embodiments of the present technology, the server 235 may have access (locally and/or remotely) to information indicative of road rules associated with the road map. Broadly speaking, road rules represent traffic laws that are determined by a body having jurisdiction and that are applicable on at least some portions of the road map. For example, road rules associated with a given section of the road map are representative of traffic laws that are applicable on that given section of the road map such as, but not limited to: pre-determined direction of traffic flow of each lane in the section of the road map, presence of particular road signs governing traffic on that section of the road map including, stop signs, yield signs, road lane signage, speed limits, indications of other types of traffic laws or rules, and the like.

It is contemplated that the server 235 may be configured to provide to the processor 110 (e.g., the processor 110 of the electronic device 210) access to the information indicative of (i) a section of the road map corresponding to surroundings of the vehicle 220 and (ii) the road rules associated with that section of the road map.

To that end, in some embodiments, the server 235 may receive a request submitted by the electronic device 210 for provision of access to the information indicative of the section of the road map (corresponding to the surroundings of the vehicle 220) and of the respectively associated road rules. For example, the request submitted by the electronic device 210 may include information indicative of vehicle position (possibly in global coordinates) of the vehicle 220. As a result, the server 235 may provide the electronic device 210 with access to the information (or provide the information itself) indicative of the section of the road map that includes the vehicle position of the vehicle 220 and of the respectively associated road rules.

For what purpose the server 235 may be configured to provide the electronic device 210 with access to the information indicative of the section of the road map corresponding to the surroundings of the vehicle 220 and the road rules associated with that section of the road map will be described in greater details herein further below.

However, the electronic device 210 may be configured to acquire access to the information (or acquire the information itself) indicative of the section of the road map corresponding to the surroundings of the vehicle 220 and of the respectively associated road rules in a different manner than via the server 235. For instance, the information indicative of the road map and the road rules may be pre-downloaded and pre-stored by the electronic device 210, without departing from the scope of the present technology.

Sensor System

In accordance with at least some embodiments of the present technology, the electronic device 210 is communicatively coupled to a sensor system 230. Broadly speaking, the sensor system 230 is configured to capture data/signals about the surroundings of the vehicle 220. The sensor system 230 is communicatively coupled to the electronic device 210 for inter alia processing the so-captured information (data/signals) by the electronic device 210. As it will be described in greater detail herein below, the processor 110 may be configured to process the so-captured information about the surroundings of the vehicle 220 for decision making and/or operation of the vehicle 220.

The location of the sensor system relative to the vehicle 220 is not particularly limiting. For example, the sensor system 230 may be mounted on an interior, upper portion of a windshield of the vehicle 220, but other locations are within the scope of the present disclosure, including on a back window, side windows, front hood, rooftop, front grill, or front bumper of the vehicle 220. Optionally, the sensor system 230 may be mounted in a dedicated enclosure (not depicted) mounted on the top of the vehicle 220. However, it is also contemplated that various components and/or sub-systems of the sensor system 230 may be mounted at different locations on the vehicle 220, without departing from the scope of the present technology.

In some embodiments of the present technology, the sensor system 230 may be calibrated. This calibration can be executed during the manufacturing and/or set up of the vehicle 220. Or at any suitable time thereafter or, in other words, the calibration can be executed during retrofitting the vehicle 220 with the sensor system 230. Alternatively, the calibration can be executed during equipping the vehicle 220 with the sensor system 230.

Returning to the description of the configuration of the sensor system 230, in some embodiments, the sensor system 230 may be configured to gather a large variety of information (data/signals) about the surroundings of the vehicle 220 and, to that end, may comprise a verity of components and/or a variety of sub-systems configured to capture this large variety of information.

In some embodiments, the sensor system 230 may comprise a camera. How the camera is implemented is not particularly limiting. For example, in one embodiments of the present technology, the camera can be implemented as a mono camera with resolution sufficient to detect objects (such as neighboring vehicles and/or road signs, for example) at a pre-determined distance of up to about 50 m (although cameras with other resolutions and ranges are within the scope of the present disclosure). It is also contemplated that the sensor system 230 may comprise a plurality of cameras. For example, the plurality of cameras may have a sufficient number of cameras to capture a surrounding/panoramic digital image of the surroundings of the vehicle 220.

In some embodiments of the present technology, the camera (or one or more cameras of the sensor system 230) may be configured to capture a pre-determined portion of the surroundings of the vehicle 220. For example, the one or more cameras may be configured to capture a digital image (or a series of digital images) that represent approximately 90 degrees of the surroundings of the vehicle 220 that are along a movement path of the vehicle 220. In another example, however, the one or more cameras may be configured to capture digital image(s) that represent approximately 360 degrees of the surroundings of the vehicle 220 that are along the movement path of the vehicle 220, without departing from the scope of the present technology. In a specific non-limiting example, the one or more cameras of the sensor system 230 may be of the type available from FLIR Integrated Imaging Solutions Inc., 12051 Riverside Way, Richmond, BC, V6 W 1K7, Canada. It should be expressly understood that the sensor system 230 can be implemented in any other suitable equipment.

In other embodiments, the sensor system 230 may comprises other components and/or other sub-systems that are communicatively coupled to the electronic device 210. For instance, the sensor system 230 may comprise: an Inertial Measurement Unit (IMU), a LIght Detection And Ranging (LIDAR) system, a radar system, a sonar system, other image-based sensory sub-systems, and other types of sub-systems that are configured to capture information (data/signals) about the surroundings of the vehicle 220.

As mentioned above, the sensor system 230 may be configured to capture a variety of information about the surroundings of the vehicle 220. For example, at least some information captured by the sensor system 230 about the surroundings of the vehicle 220 may comprise object-related information, such as information regarding neighboring vehicles and/or road signs in proximity to the vehicle 220. Additionally, the information about the surroundings of the vehicle 220 may include other types of position data that can be (i) captured by the sensor system 230 and (ii) transmitted to the processor 110.

For example, the sensor system 230 may be configured to capture data that, once processed, allow the electronic device 210 to detect the presence of, position of, and/or orientation of objects such as the vehicle 220, the neighboring vehicles, and/or road signs. In another example, the sensor system 230 may be configured to capture data that, once processed, allow the electronic device 210 to determine kinematic data associated with various objects that are located in the surroundings of the vehicle 220 such as, but not limited to: positions of objects, speed and/or velocity of objects, acceleration of objects, and the like.

It is also contemplated that the sensor system 230 may be configured to capture data that, once processed, allow the electronic device 210 to determine inter alia: (i) vehicle position of the vehicle 220 (potentially in global coordinates) based on signals (e.g., GPS signals) from a plurality of satellites, (ii) distances of the vehicle 220 to objects within the surroundings of the vehicle 220 for determining position and orientation of the vehicle 220 and of the objects within the surroundings of the vehicle 220, and (iii) any other data that may be used to determine a current state of the vehicle 220 and/or a current state of the surroundings of the vehicle 220 including the presence of, position of, and orientation of neighboring vehicles in reference to the vehicle 220 and/or to another reference in the surroundings of the vehicle 220 (such as an intersection, for example).

The sensor system 230 and/or the processor 110 may also be communicatively coupled to one or more vehicle systems of the vehicle 220. For example, the sensor system 230 may be communicatively coupled to a vehicle braking system, a vehicle propulsion system, a vehicle steering system, and the like. In some embodiments of the present technology, the sensor system 230 and/or the processor 110 may acquire information indicative of performance of the one or more vehicle systems of the vehicle 220.

Processor

As previously alluded to, the processor 110 (such as the processor 110 of the electronic device 210, for example) is configured to inter alia process (i) information that is provided thereto by the sensor system 230, (ii) information that is indicative of the section of the road map corresponding to the surroundings of the vehicle 220, and (iii) information that is indicative of the road rules associated with that section of the road map, for the purpose of decision making and/or operation of the vehicle 220.

In some embodiments of the present technology, the processor 110 may be configured to determine "vehicle priority information" for the section of the road map. Put another way, at a current moment in time, the processor 110 may be configured to determine information indicative of priorities of vehicles on the section of the road map.

It is also contemplated that the processor 110 may be configured to make use of this vehicle priority information for determining a "trajectory estimation order" for vehicles on the section of the roadmap. Put another way, based on the vehicle priority information, the processor 110 may be configured to determine an order in which trajectories of vehicles on the section of the roadmap are to be estimated.

It should be noted that developers of the present technology have realized that determining the vehicle priority information and the trajectory estimation order as contemplated in at least some embodiments of the present technology may provide at least some technical advantages in comparison to prior art solutions. At least one of the advantages will be discussed herein further below with reference to FIG. 5.

However, prior to that, (i) how priorities of vehicles on the section of the road map (e.g., vehicle 220 and neighboring vehicles) are determined, (ii) in which form is the vehicle priority information can be determined/generated by the processor 110, and (iii) how the vehicle priority information is then used for determining the trajectory estimation order for the vehicles on the section of the road map, will now be described in turn.

Figure 3:
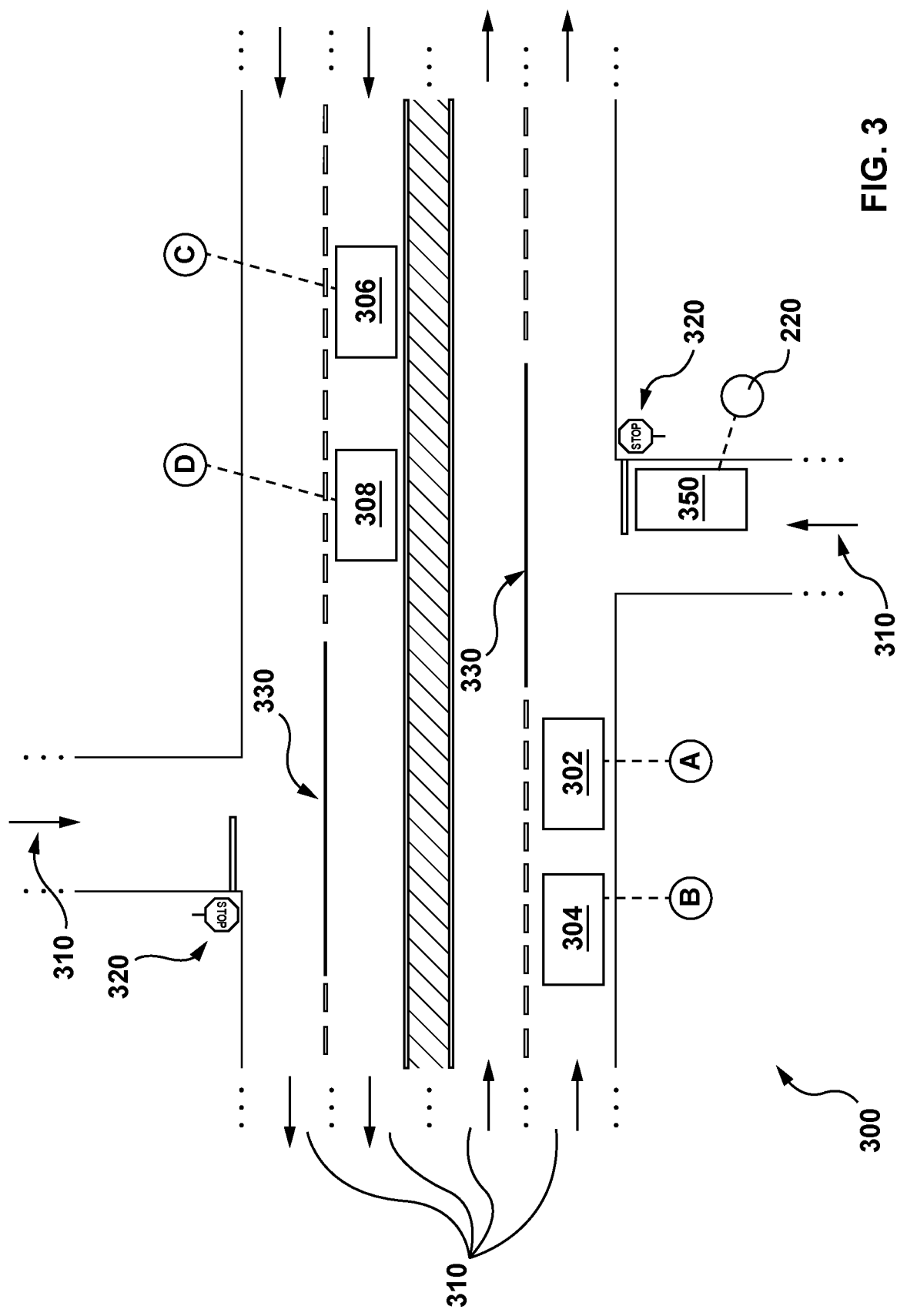
FIG. 3 depicts an example of a scenario for determining vehicle priority information by a processor of the computer system of FIG. 1.

With reference to FIG. 3, there is depicted an example of a road scenario that will be used to describe at least some functionalities of the processor 110.

In FIG. 3, there is depicted a visual representation 300 of a section of the road map that corresponds to the surroundings of the vehicle 220. It should be noted however, that the visual representation 300 is depicted solely for the purpose of illustration of the scenario and, thus, the processor 110 does not have to actually display the visual representation 300.

As it can be seen, the visual representation 300 generally shows the section of the road map having (i) a main road with four main lanes (extending left to right in the orientation of FIG. 3) and two auxiliary roads each having one auxiliary lane (one is located near the top of FIG. 3, while the other one is located near the bottom of the FIG. 3)

In FIG. 3, there are also depicted visual representations 310, 320, and 330 of at least some road rules associated with the section of the road map. It should be noted however, that the visual representations 310, 320 and 330 are depicted solely for the purpose of illustration of the exemplary scenario and, thus, the processor 110 does not have to actually display the visual representations 310, 320 and 330.

As it can be seen, the visual representations 310 generally show pre-determined directions of traffic of respective lanes by which vehicles travelling in those lanes ought to abide. The visual representations 320 generally show a rule of traffic (such as an indication to stop) by which vehicles ought to abide. The visual representations 330 generally show another rule of traffic (such as an indication of prohibited lane change) by which vehicles ought to abide.

In FIG. 3, there are also depicted visual representations 350, 302, 304, 306, and 308 of vehicles on the section of the road map. It should be noted however, that the visual representations 350, 302, 304, 306, and 308 are depicted solely for the purpose of illustration of the exemplary scenario and, thus, the processor 110 does not have to actually display the visual representations 350, 302, 304, 306, and 308.

Let it be assumed that a position and an orientation of the visual representation 350 on the visual representation 300 of the section of the road map corresponds to the position and the orientation of the vehicle 220, while positions and orientations of the visual representations 302, 304, 306 and 308, respectively, on the visual representation 300 of the section of the road map correspond to the positions and the orientations of neighboring vehicles in the surroundings of the vehicle 220. As mentioned above, the positions and the orientations of the vehicle 220 and of the neighboring vehicles may be determined based on information captured by the sensor system 230 of the vehicle 220 (see FIG. 2).

For illustration purposes of the scenario, let it be assumed that: (i) the visual representation 350 is associated with the vehicle 220 that is on one of the auxiliary roads and is approaching the main road, (ii) the visual representation 302 is associated with a neighboring vehicle A travelling on the main road, (iii) the visual representation 304 is associated with a neighboring vehicle B following the neighboring vehicle A on the main road, (iv) the visual representation 306 is associated with a neighboring vehicle C travelling on the main road in a direction opposite to the neighboring vehicles A and B, and (v) the visual representation 308 is associated with a neighboring vehicle D that is travelling in front of the neighboring vehicle C.

In some embodiments of the present technology, the processor 110 may be configured to identify pairs of vehicles on the section of the road map that have intersecting potential trajectories.

To that end, the processor 110 may be configured to employ (i) the information indicative of the positions and the orientations of respective vehicles and (ii) the information indicative of the road rules, in order to determine potential trajectories of the respective vehicles. Then, the processor 110 may be configured to determine which of these potential trajectories intersect, thereby identifying the pairs of vehicles on the section of the road map that have intersecting potential trajectories. In the exemplary scenario of FIG. 3, the processor 110 may be configured to identify the following pairs of vehicles:

(i) a pair consisting of the neighboring vehicles A and B;
(ii) a pair consisting of the neighboring vehicle A and the vehicle 220;
(iii) a pair consisting of the neighboring vehicle B and the vehicle 220; and
(iv) a pair consisting of the neighboring vehicles C and D.

It should be noted that, in the scenario of FIG. 3, the processor 110 may be configured not to identify, for example, a pair consisting of neighboring vehicles A and D since they do not have any intersecting potential trajectories. Hence, it can be said that the pairs of vehicles identified by the processor 110 (that have intersecting potential trajectories) may or may not include all possible pairs of vehicles on the section of the roadmap—that is, the identified pairs of vehicles by the processor 110 will depend inter alia on a given scenario in which the vehicle 220 finds itself.

The processor 110 is then configured to process each identified pair of vehicles (individually) in order to determine which one in a respective identified pair of vehicles has priority over the other one in the respective identified pair of vehicles. For example, in order to do so, the processor 110 may be configured to employ (i) the road rules and (ii) the respective positions and the orientations of the vehicles in the respective identified pairs. This means that the processor 110 may be configured to process the above-mentioned identified pairs of vehicles for determining the vehicle priority information indicative of priorities of the vehicles on the section of the road map. For example, by processing the above-mentioned identified pairs of vehicles, the processor 110 may determine that:

(i) in the pair consisting of the neighboring vehicles A and B (based on the road rules, for example), the neighboring vehicle A has priority over the neighboring vehicle B;
(ii) in the pair consisting of the neighboring vehicle A and the vehicle 220, the neighboring vehicle A has priority over the vehicle 220;
(iii) in the pair consisting of the neighboring vehicle B and the vehicle 220, the neighboring vehicle B has priority over the vehicle 220; and
(iv) in the pair consisting of the neighboring vehicles C and D, the neighboring vehicle D has priority over the neighboring vehicle C.

The immediately-above list of determinations generated by the processor 110 may represent the vehicle priority information of vehicles on the section of the road map. The processor 110 may be configured to determine this vehicle priority information in various formats. However, in accordance with at least some embodiments of the present technology, the processor 110 may be configured to determine the vehicle priority information in a form of one or more graph structures.

Figure 4:
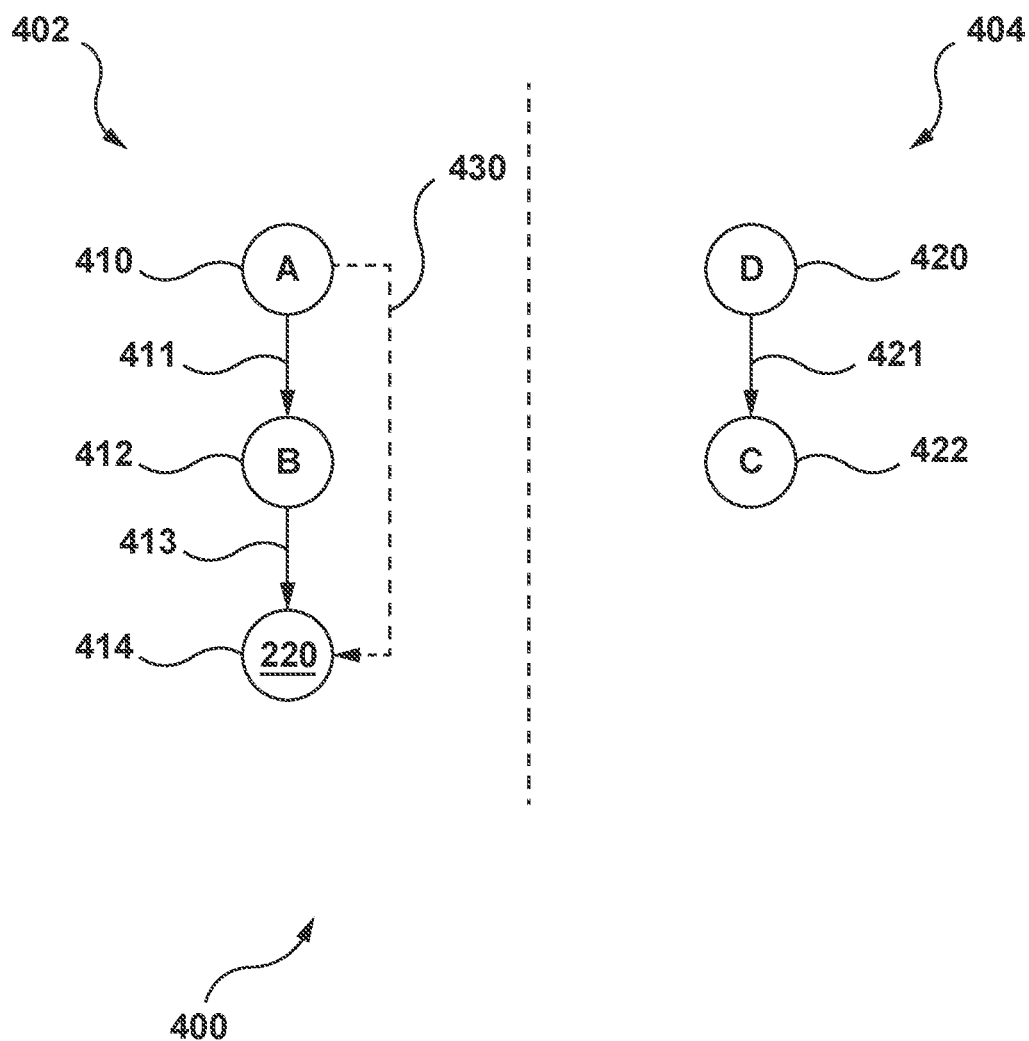
FIG. 4 depicts a representation of the vehicle priority information in a form of two graph structures, in accordance with at least implementations of the present technology.

With reference to FIG. 4, there are depicted two graph structures that the processor 110 may generate in response to the determination of which one in a respective identified pair of vehicles has priority over the other one in the respective identified pair of vehicles. Put another way, there is depicted a graph-type representation 400 of the vehicle priority information that the processor 110 is configured to determine.

As mentioned above, the graph-type representation 400 of the vehicle priority information of the illustrative scenario comprises the two graph structures, namely a first graph structure 402 and a second graph structure 404. As it can be seen, the first graph structure 402 has three vertices, namely (i) a first vertex 410, (ii) a second vertex 412, and (iii) a third vertex 414. Also, the second graph structure 404 has two vertices, namely (i) a fourth vertex 420, and (ii) a fifth vertex 422.

It should be noted that each vertex of a given graph structure is associated with a respective vehicle on the section of the road map that corresponds to the surroundings of the vehicle 220. For example, (i) the first vertex 410 is associated with the neighboring vehicle A, (ii) the second vertex 412 is associated with the neighboring vehicle B, (iii) the third vertex 414 is associated with the vehicle 220, (iv) the fourth vertex 420 is associated with the neighboring vehicle D, (v) and the fifth vertex is associated with the neighboring vehicle C.

It is contemplated that the one or more graph structures generated by the processor 110 (that represent the vehicle priority information) may have a same number of vertices as a number of vehicles on the section of the road map.

In addition to having respective vertices, each one of the first graph structure 402 and the second graph structure 404 has edges. For example, the first graph structure 402 has (i) a first edge 411, and (ii) a second edge 413, while the second graph structure 404 has a third edge 421.

As it can also be seen, a given edge connects a pair of respective vertices—that is, (i) the first edge 411 connects the first vertex 410 and the second vertex 412, (ii) the second edge 413 connects the second vertex 412 and the third vertex 414, and (iii) the third edge 421 connects the fourth vertex 420 and the fifth vertex 422.

Recalling that each vertex is representative of a respective vehicle on the section of the road map, a given pair of vertices connected by a respective edge is indicative of a respective identified pair of vehicles on the section of the road map (that have intersection potential trajectories). Hence, it can be also said that the respective edge between a given identified pair of vehicles represents which one of the respective identified pair of vehicles has priority over the other one of the respective identified pair of vehicles.

To better illustrate this, let's take a pair of vertices including the first vertex 410 and the second vertex 412, as an example. This pair of vertices is connected by the first edge 411. Recalling that the first vertex 410 is associated with the neighboring vehicle A, and that the second vertex 412 is associated with the neighboring vehicle B, the first edge 411 represents the information indicative of that the neighboring vehicle A has priority over the neighboring vehicle B (in the exemplary scenario).

In another example, let's take another pair of vertices including the second vertex 412 and the third vertex 414. This another pair of vertices is connected by the second edge 413. Recalling that the second vertex 412 is associated with the neighboring vehicle B, and that the third vertex 414 is associated with the vehicle 220, the second edge 413 represents the information indicative of that the neighboring vehicle B has priority over the vehicle 220 (in the exemplary scenario).

However, it should also be noted that the first graph structure 402 further represents additional information—that is, that the neighboring vehicle A (associated with the first vertex 410) has priority over the vehicle 220 (associated with the third vertex 414). It is contemplated that in some embodiments of the present technology, the processor 110 may be configured to generate the first graph structure 402 including an auxiliary edge 430 that is indicative of this additional information.

In summary, it can be said that the vehicle priority information determined by the processor 110 may be implemented as the processor 110 being configured to generate one or more graph structures, such as the first graph structure 402 and the second graph structure 404, for example, that represent the vehicle priority information for vehicles on the section of the road map.

Also, as seen in FIG. 4, each one of the first graph structure 402 and the second graph structure 404 is a hierarchical structure—that is, a given graph structure generated by the processor 110 represents a "priority-based hierarchy" between vehicles associated with respective vertices of the given graph structure. This means that, in the scenario of FIG. 3, the processor 110 may be configured to generate two graph structures and, hence, two priority-based hierarchies of vehicles.

For example, in the case of the first graph structure 402, at the top of the priority-based hierarchy between (i) the neighboring vehicle A, (ii) the neighboring vehicle B and (iii) the vehicle 220, there is the neighboring vehicle A.

In the context of the present specification, a vehicle being at the top of a given priority-based hierarchy is referred to as a "main vehicle". For example, in the first graph structure 402 that represents a first priority-based hierarchy between (i) the neighboring vehicle A, (ii) the neighboring vehicle B and (iii) the vehicle 220, the main vehicle is the neighboring vehicle A. In another example, in the second graph structure 404 that represents a second priority-based hierarchy between (i) the neighboring vehicle C, and (ii) the neighboring vehicle D, the main vehicle is the neighboring vehicle D.

It should be noted that a given main vehicle in a given priority-based hierarchy of vehicles is a vehicle that has priority over all vehicles in that given priority-based hierarchy. Put another way, this means that the given main vehicle may undertake any potential trajectory while having the right of way over any other vehicle in the given priority-based hierarchy.

In some embodiments of the present technology, it can be said that a given main vehicle of a given priority-based hierarchy is a least affected vehicle by other vehicles in the given priority-based hierarchy than any other vehicle in that given priority-based hierarchy.

It should also be noted that vehicles associated with vertices of the first graph structure 402 (and hence the vehicles within the first priority-based hierarchy) can be said to be "priority independent" from vehicles associated with vertices of the second graph structure 404 (and hence the vehicles within the second priority-based hierarchy). Put another way, this means that any potential trajectory of any vehicle within the first priority-based hierarchy is independent from any potential trajectory of any other vehicle within the second priority-based hierarchy.

As mentioned above, once the vehicle priority information is determined by the processor 110 (for example, in the form of the first graph structure 402 and the second graph structure 404), the processor 110 may be configured to use this vehicle priority information for determining the trajectory estimation order for the vehicles on the section of the road map.

It is contemplated that the processor 110 may be configured to determine the trajectory estimation order such that it concords with a given priority-based hierarchy of vehicles of a given graph structure.

To better illustrate this, let's take the first graph structure 402 as an example. As mentioned above, the first priority-based hierarchy of vehicles of the first graph structure 402 is such that (i) the neighboring vehicle A has priority over all other vehicles in the first graph structure (i.e., the neighboring vehicle A being the main vehicle), (ii) the neighboring vehicle B is a second vehicle in the first priority-based hierarchy (e.g., does not have priority over the main vehicle), and (iii) the vehicle 220 is a third vehicle in the first priority-based hierarchy (e.g., does not have priority over the main vehicle nor over the second vehicle of the first priority-based hierarchy). Therefore, the processor 110 may be configured to determine the trajectory estimation order for the neighboring vehicle A, the neighboring vehicle B and the vehicle 220 such that:

(i) at least one estimated trajectory of the neighboring vehicle A is to be determined first;

(ii) at least one estimated trajectory of the neighboring vehicle B is to be determined after the at least one estimated trajectory of the neighboring vehicle A; and (iii) at least one estimated trajectory of the vehicle 220 is to be determined after the at least one estimated trajectory of the neighboring vehicle A, and after the at least one estimated trajectory of the neighboring vehicle B.

The reason for such a trajectory estimation order is that, in order to determine the at least one estimated trajectory of the neighboring vehicle B for example, the at least estimated trajectory for the neighboring vehicle A needs to be determined first, since it may influence the at least one estimated trajectory of the neighboring vehicle B due the priority of the neighboring vehicle A over the neighboring vehicle B.

By the same token, in order to determine the at least one estimated trajectory of the vehicle 220 for example, the at least one estimated trajectory for the neighboring vehicle B needs to be determined prior to the at least one estimated trajectory of the vehicle 220, since it may influence the at least one estimated trajectory of the vehicle 220 due to the priority of the neighboring vehicle B over the vehicle 220. However, as mentioned above, prior to the determination of the at least one estimated trajectory for the neighboring vehicle B, the processor 110 may need to determine the at least one estimated trajectory of the neighboring vehicle A.

Therefore, first, the processor 110 may determine the at least one estimated trajectory of the neighboring vehicle A, then, determine the at least one estimated trajectory of the neighboring vehicle B (while having knowledge of the at least one estimated trajectory of the neighboring vehicle A), and then, determine the at least one estimated trajectory of the vehicle 220 (while having knowledge of both (i) the at least one estimated trajectory of the neighboring vehicle A, and (ii) the at least one estimated trajectory of the neighboring vehicle B).

In some embodiments of the present technology, the processor 110 may be configured to determine a target trajectory of the vehicle 220. For example, the processor 110 may be configured to select one of the at least one estimated trajectory of the vehicle 220 as the target trajectory of the vehicle 220 (the target trajectory being the actual trajectory that the vehicle 220 should undertake in the exemplary scenario of FIG. 3).

Hence, in order to determine the target trajectory of the vehicle 220, the processor 110 may first determine the at least one estimated trajectory of the vehicle 220. As mentioned above, the processor 110 may determine the at least one estimated trajectory of the vehicle 220 in accordance with the trajectory estimation order.

It is contemplated that the processor 110 may make use of the trajectory estimation order for determining that it does not require determining estimated trajectories of the neighboring vehicles C and D for determining the at least one estimated trajectory of the vehicle 220 since, as previously alluded to, the vehicle 220 is priority independent from the neighboring vehicles C and D.

For example, the fourth vertex 420 and the fifth vertex 422 associated with the neighboring vehicle D and the neighboring vehicle C, respectively, are not part of the first graph structure 402, but rather of the second graph structure 404, and thus, are not part of the trajectory estimation order that includes the vehicle 220 (the trajectory estimation order of the vehicle 220 is based on the first priority-based hierarchy of the first graph structure 402, as opposed to the second priority-based hierarchy of the second graph structure 404).

Additionally, the processor 110 may make use of the trajectory estimation order in order to determine that estimated trajectories of the neighboring vehicles A and B need to be determined for determining the at least one estimated trajectory of the vehicle 220.

Put another way, in at least some embodiments of the present technology, the processor 110 may make use of the trajectory estimation order in order to follow the following processing sequence:
(i) actively or passively, determine that the at least one estimated trajectory of the neighboring vehicle C and the at least one estimated trajectory of the neighboring vehicle D do not need to be determined for determining the at least one estimated trajectory of the vehicle 220;
(ii) actively or passively, determine that the at least one estimated trajectory of the neighboring vehicle A and the at least one estimated trajectory of the neighboring vehicle B need to be determined for determining the at least one estimated trajectory of the vehicle 220;
(iii) determine the at least one estimated trajectory of the neighboring vehicle A;
(iv) based on the at least one estimated trajectory of the neighboring vehicle A, determine the at least one estimated trajectory of the neighboring vehicle B; and
(v) based on the at least one estimated trajectory of the neighboring vehicle A and based on the at least one estimated trajectory of the neighboring vehicle B, determine the at least one estimated trajectory of the vehicle 220.

Once the at least one estimated trajectory of the vehicle 220 are so-determined, the processor 110 may be configured to input the at least one estimated trajectory of the vehicle 220 into a Machine Learned Algorithm (MLA) having been trained to select the target trajectory of the vehicle 220 amongst the at least one estimated trajectory of the vehicle 220.

Optionally, it is contemplated that in addition to inputting the at least one estimated trajectory of the vehicle 220 determined by the processor 110 into the MLA for receiving as output the target trajectory of the vehicle 220, the processor 110 may be configured to further input additional in-use data indicative of states of at least some vehicles on the section of the road map.

In some embodiments, this additional in-use data may include kinematic data about the at least some vehicles on the section of the road map. For example, the additional in-use data inputted into the MLA by the processor 110 may include kinematic data about vehicles in the first priority-based hierarchy of vehicles including the vehicle 220—this means, that the processor 110 may input kinematic data about the neighboring vehicle A and the neighboring vehicle B, while not inputting the kinematic data about the neighboring vehicle C and the neighboring vehicle D as they are part of the second priority-based hierarchy of vehicles.

In the context of the scenario depicted in FIG. 3, the MLA may be configured to output the target trajectory for the vehicle 220 that is indicative of the vehicle 220 yielding way to the neighboring vehicles A and B by stopping, letting them pass, and then engage onto the main road after the neighboring vehicles A and B have passed.

Figure 5:
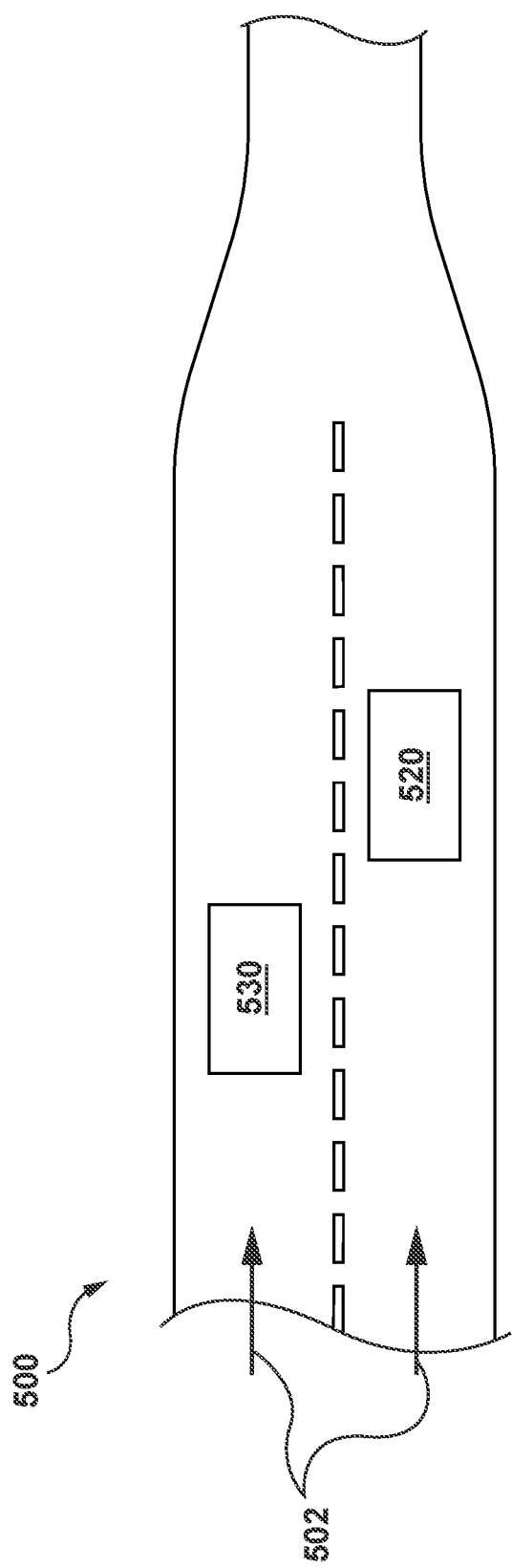
FIG. 5 depicts an example of another scenario for describing at least one advantage of using the vehicle priority information in at least some implementations of the present technology.
Figure 6:
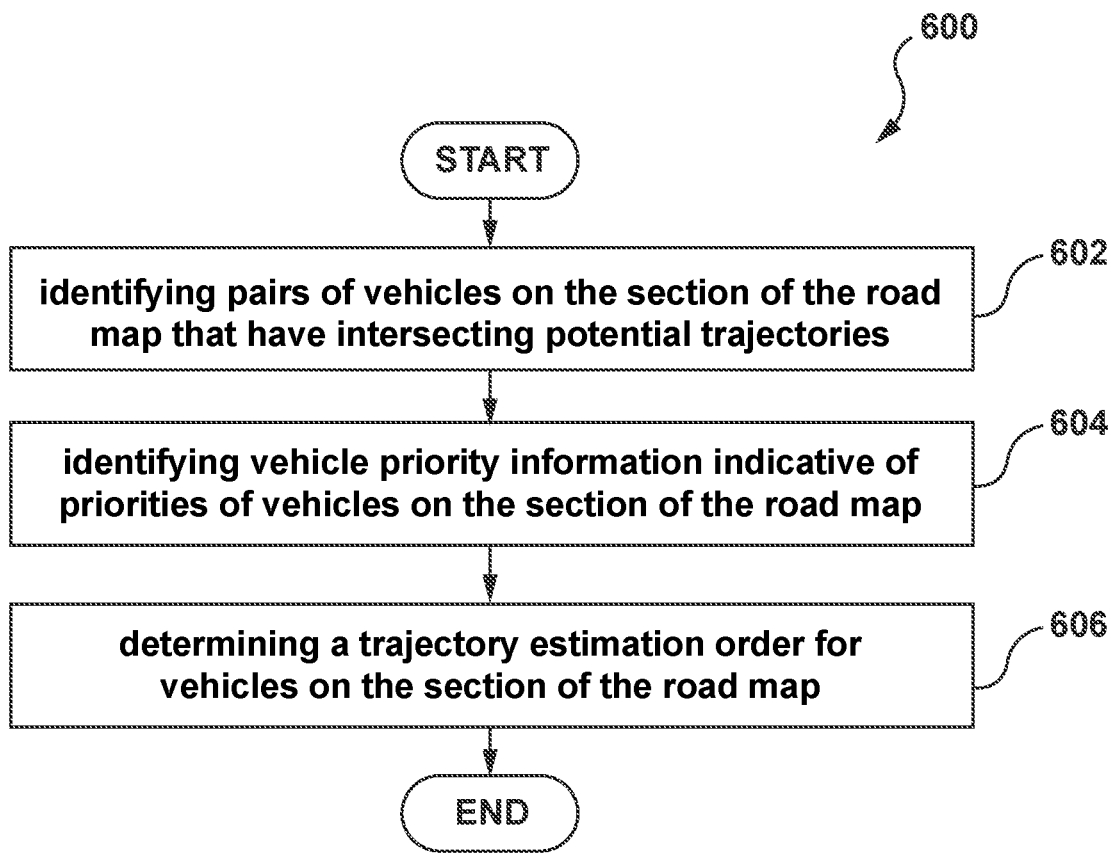
FIG. 6 depicts a flow chart of a method, the method executable by a computer device, in accordance with the non-limiting embodiments of the present technology.

At least one potential advantage of the present technology will now be discussed with respect to another exemplary scenario depicted on FIG. 5. There is depicted a visual representation 500 of another section of the road map. Also, there is depicted (i) a visual representation 520 corresponding to a first autonomous vehicle, and (ii) a visual representation 530 corresponding to a second autonomous vehicle. In this another exemplary scenario, a road on the another section of the road map has a pair of lanes that are merging into a single lane. As such, the decision making process of each of the first autonomous vehicle and the second autonomous vehicle may include the determination of which one should proceed first and which one should give way.

The developers of the present technology have realized that autonomous vehicles have a tendency, by design, to be risk averse for promoting safety on the roads. As such, although in accordance with the road rules the first autonomous vehicle has priority (right of way) over the second autonomous vehicle, the first autonomous vehicle may still decide to give way to the second autonomous vehicle due to the very close proximity of the second autonomous vehicle. By the same token, due to the risk averse tendencies of autonomous vehicles, the second autonomous vehicle may also decide to give way to the first autonomous vehicle.

Hence, in this another scenario, the developers of the present technology realized that a pair of autonomous vehicles, due to their tendency of being risk averse, may begin to both slow down for trying to give way to the other one.

In order to avoid similar interactions amongst pairs of autonomous vehicles, the developers of the present technology have designed systems that are able to determine a trajectory estimation order as disclosed herein that, if implemented by both autonomous vehicles, will result in both autonomous vehicles determining a same trajectory estimation order. It should be noted that, it is not important which one of the first autonomous vehicle and the second autonomous vehicle will have his estimated trajectory dependent on the other one (based on that same trajectory estimation order). What is important however is that due to having determined the same trajectory estimation order, the dependency of the estimated trajectories will be determined in the same manner by both autonomous vehicles and as such, only one of the autonomous vehicles will decide to give way while the other one will decide to proceed first.

In at least some embodiments of the present technology, the first autonomous vehicle and the second autonomous vehicle may be configured to exchange a variety of information amongst each other. This means that, in at least some embodiments, it is contemplated that the processor 110 of the first autonomous vehicle may be configured to transmit and/or trigger the transmission of at least some information to the processor 110 of the second autonomous vehicle and vice versa.

For example, the first autonomous vehicle may transmit to the second autonomous vehicle (and/or trigger the transmission of) information indicative of the trajectory estimation order determined by the processor 110 of the first autonomous vehicle (and/or of the server 235) to the processor 110 of the second autonomous vehicle. In another example, the first autonomous vehicle may transmit to the second autonomous vehicle the kinematic data that has been gathered via a respective sensor system. In a further example, the first autonomous vehicle may transmit to the second autonomous vehicle the object-related information that has been gathered via a respective sensor system. In yet another example, the first autonomous vehicle may transmit to the second autonomous vehicle information indicative of the target trajectory to the first autonomous vehicle.

It is contemplated that exchanging such information between the first autonomous vehicle and the second autonomous vehicle may aid in reducing the processing that the processor 110 of the second autonomous vehicle would otherwise perform for determining the transmitted information, if need be, and allowing allocating these extra processing resources for other uses. In addition, exchanging such information between the first autonomous vehicle and the second autonomous vehicle may be beneficial when a sensor system of the second autonomous vehicle is at least partially obstructed and/or in a state that prevents it to gather at least some relevant information about its surroundings for decision making and/or operation.

In some embodiments of the present technology, there is provided a method 600 of determining a trajectory estimation order for vehicles and which is executable by the processor 110, such as the processor 110 of the electronic device 210 and/or of the server 235. In some embodiments, at least some steps of the method 600 may be executed by the processor 110 of the electronic device 210. In other embodiments, at least some steps of the method 600 may be executed by the processor 110 of the server 235. In additional embodiments, some steps of the method 600 may be executed by the processor 110 of the electronic device 210, while other steps of the method 600 may be executed by the processor 110 of the server 235, without departing from the scope of the present technology. The method 600 will now be described in greater details.

Step 602: Identifying Pairs of Vehicles on the Section of the Road Map that have Intersecting Potential Trajectories The method 600 begins at step 602 with the processor 110 configured to identify pairs of vehicles on the section of the road map that have intersecting potential trajectories. It is contemplated that, in some embodiments, in order to execute the step 602, the processor 110 may have access to inter alia information indicative of the section of the road map corresponding to the surroundings of the vehicle 220 and of the road rules associated with that section of the road map.

For example, the processor 110 may be configured to employ (i) the information indicative of the positions and the orientations of respective vehicles and (ii) the information indicative of the road rules, in order to determine potential trajectories of the respective vehicles.

Once the potential trajectories of vehicles on the section of the road map are determined, the processor 110 may be configured to perform vehicle pairwise comparisons—that is, for each given pair of vehicles, the processor 110 may determine whether vehicles in the given pair of vehicles have intersecting potential trajectories. It can also be said that once the potential trajectories of vehicles on the section of the road map are determined, the processor 110 may be configured to determine which of these potential trajectories intersect, thereby identifying the pairs of vehicles on the section of the road map that have intersecting potential trajectories.

As mentioned above, in the exemplary scenario of FIG. 3, the processor 110 may be configured to identify the following pairs of vehicles:

(i) the pair consisting of the neighboring vehicles A and B;
(ii) the pair consisting of the neighboring vehicle A and the vehicle 220;
(iii) the pair consisting of the neighboring vehicle B and the vehicle 220; and
(iv) the pair consisting of the neighboring vehicles C and D.

It should be noted that, in the scenario of FIG. 3, the processor 110 may be configured not to identify, for example, the pair consisting of neighboring vehicles A and D since they do not have any intersecting potential trajectories. Hence, it can be said that the pairs of vehicles identified by the processor 110 (that have intersecting potential trajectories) may or may not include all possible pairs of vehicles on the section of the roadmap—that is, the identified pairs of vehicles by the processor 110 will depend inter alia on a given scenario in which the vehicle 220 finds itself.

Step 604: Identifying Vehicle Priority Information Indicative of Priorities of Vehicles on the Section of the Road Map The method 600 continues to step 604 with the processor 110 configured to identify vehicle priority information indicative of priorities of vehicles on the section of the road map. It should be noted that step 604 may comprise the processor 110 configured to use the road rules for determining which one in a respective identified pair of vehicles (as identified in step 602) has priority over the other one in the respective identified pair of vehicles.

It is contemplated that the processor 110 may be configured to process each identified pair of vehicles (individually) in order to determine which one in a respective identified pair of vehicles has priority over the other one in the respective identified pair of vehicles. For example, in order to do so, the processor 110 may be configured to employ (i) the road rules and (ii) the respective positions and the orientations of the vehicles in the respective identified pairs. Put another way, the processor 110 may be configured to process the above-mentioned identified pairs of vehicles for determining the vehicle priority information indicative of priorities of the vehicles on the section of the road map. For example, with reference to FIG. 3, by processing the above-mentioned identified pairs of vehicles, the processor 110 may determine that:
  (i) in the pair consisting of the neighboring vehicles A and B (based on the road rules, for example), the neighboring vehicle A has priority over the neighboring vehicle B;
  (ii) in the pair consisting of the neighboring vehicle A and the vehicle 220, the neighboring vehicle A has priority over the vehicle 220;
  (iii) in the pair consisting of the neighboring vehicle B and the vehicle 220, the neighboring vehicle B has priority over the vehicle 220; and
  (iv) in the pair consisting of the neighboring vehicles C and D, the neighboring vehicle D has priority over the neighboring vehicle C.

The immediately-above list of determinations generated by the processor 110 may represent the vehicle priority information of vehicles on the section of the road map. The processor 110 may be configured to determine this vehicle priority information in various formats.

However, in accordance with at least some embodiments of the present technology, the processor 110 may be configured to determine the vehicle priority information in a form of one or more graph structures. For example, the processor 110 may be configured to generate at least one graph structure. The at least one graph structure has vertices and edges, where a given edge connects a pair of vertices. A given pair of vertices is indicative of a respective pair of vehicles on the section of the road map, and a given edge represents which one of a first one in the respective pair of vehicles has priority over a second one in the respective pair of vehicles.

It is contemplated that a given graph structure may be, as mentioned above, a hierarchical structure representing a priority-based hierarchy between the vehicles. For example, as seen in FIG. 4, each one of the first graph structure 402 and the second graph structure 404 is a hierarchical structure—that is, a given graph structure generated by the processor 110 represents a priority-based hierarchy between vehicles associated with respective vertices of the given graph structure. This means that, in the scenario of FIG. 3, the processor 110 may be configured to generate two graph structures and, hence, two priority-based hierarchies of vehicles.

In the case of the first graph structure 402, at the top of the priority-based hierarchy between (i) the neighboring vehicle A, (ii) the neighboring vehicle B and (iii) the vehicle 220, there is the neighboring vehicle A.

In the context of the present specification, a vehicle being at the top of a given priority-based hierarchy is referred to as a main vehicle. For example, in the first graph structure 402 that represents the first priority-based hierarchy between (i) the neighboring vehicle A, (ii) the neighboring vehicle B and (iii) the vehicle 220, the main vehicle is the neighboring vehicle A. In another example, in the second graph structure 404 that represents the second priority-based hierarchy between (i) the neighboring vehicle C, and (ii) the neighboring vehicle D, the main vehicle is the neighboring vehicle D.

It should be noted that a given main vehicle in a given priority-based hierarchy of vehicles is a vehicle that has priority over all vehicles in that given priority-based hierarchy. Put another way, this means that the given main vehicle may undertake any potential trajectory while having the right of way over any other vehicle in the given priority-based hierarchy.

In some embodiments of the present technology, it can be said that a given main vehicle of a given priority-based hierarchy is a least affected vehicle by other vehicles in the given priority-based hierarchy than any other vehicle in that given priority-based hierarchy.

It should also be noted that vehicles associated with vertices of the first graph structure 402 (and hence the vehicles within the first priority-based hierarchy) can be said to be priority independent from vehicles associated with vertices of the second graph structure 404 (and hence the vehicles within the second priority-based hierarchy). Put another way, this means that any potential trajectory of any vehicle within the first priority-based hierarchy is independent from any potential trajectory of any other vehicle within the second priority-based hierarchy.

Therefore, as explained above, it can be said that a given hierarchical structure representing a given priority-based hierarchy between a set of vehicles has on top thereof a main vehicle, and that the main vehicle is a least affected vehicle by vehicles in the given priority-based hierarchy than any other vehicle in the given priority-based hierarchy.

It can also be said that, in some embodiments, the processor 110 may be configured to generate a plurality of graph structures that comprise a plurality of hierarchical structures each representing a respective priority-based hierarchy between respective vehicles. Also, each hierarchical structure may have on top thereof a respective main vehicle and where the respective main vehicle is a least affected vehicle by the vehicles in the respectively associated priority-based hierarchy than any other vehicle in the respectively associated priority-based hierarchy.

Step 606: Determining a Trajectory Estimation Order for Vehicles on the Section of the Road Map The method 606 continues to step 606 with the processor 110 configured to, based on the vehicle priority information, determine a trajectory estimation order for vehicles on the section of the road map. The processor 110 is configured to determine the trajectory estimation order such that a given vehicle having priority over another vehicle in the vehicle priority information is above another vehicle in the trajectory estimation order.

It is contemplated that the processor 110 may be configured to determine the trajectory estimation order such that it concords with a given priority-based hierarchy of vehicles of a given graph structure.

As explained above, let's take the first graph structure 402 as an example. As mentioned above, the first priority-based hierarchy of vehicles of the first graph structure 402 is such that (i) the neighboring vehicle A has priority over all other vehicles in the first graph structure (i.e., the neighboring vehicle A being the main vehicle), (ii) the neighboring vehicle B is a second vehicle in the first priority-based hierarchy (e.g., does not have priority over the main vehicle), and (iii) the vehicle 220 is a third vehicle in the first priority-based hierarchy (e.g., does not have priority over the main vehicle nor over the second vehicle of the first priority-based hierarchy). Therefore, the processor 110 may be configured to determine the trajectory estimation order for the neighboring vehicle A, the neighboring vehicle B and the vehicle 220 such that:
  (i) at least one estimated trajectory of the neighboring vehicle A is to be determined first;

(ii) at least one estimated trajectory of the neighboring vehicle B is to be determined after the at least one estimated trajectory of the neighboring vehicle A; and (iii) at least one estimated trajectory of the vehicle 220 is to be determined after the at least one estimated trajectory of the neighboring vehicle A, and after the at least one estimated trajectory of the neighboring vehicle B.

The reason for such a trajectory estimation order is that, in order to determine the at least one estimated trajectory of the neighboring vehicle B for example, the at least estimated trajectory for the neighboring vehicle A needs to be determined first, since it may influence the at least one estimated trajectory of the neighboring vehicle B due the priority of the neighboring vehicle A over the neighboring vehicle B.

By the same token, in order to determine the at least one estimated trajectory of the vehicle 220 for example, the at least one estimated trajectory for the neighboring vehicle B needs to be determined prior to the at least one estimated trajectory of the vehicle 220, since it may influence the at least one estimated trajectory of the vehicle 220 due to the priority of the neighboring vehicle B over the vehicle 220. However, as mentioned above, prior to the determination of the at least one estimated trajectory for the neighboring vehicle B, the processor 110 may need to determine the at least one estimated trajectory of the neighboring vehicle A. Therefore, first, the processor 110 may determine the at least one estimated trajectory of the neighboring vehicle A, then, determine the at least one estimated trajectory of the neighboring vehicle B (while having knowledge of the at least one estimated trajectory of the neighboring vehicle A), and then, determine the at least one estimated trajectory of the vehicle 220 (while having knowledge of both (i) the at least one estimated trajectory of the neighboring vehicle A, and (ii) the at least one estimated trajectory of the neighboring vehicle B).

In some embodiments of the present technology, the processor 110 may be configured to determine a target trajectory of the vehicle 220. For example, the processor 110 may be configured to select one of the at least one estimated trajectory of the vehicle 220 as the target trajectory of the vehicle 220 (the target trajectory being the actual trajectory that the vehicle 220 should undertake in the exemplary scenario of FIG. 3).

Hence, in order to determine the target trajectory of the vehicle 220, the processor 110 may first determine the at least one estimated trajectory of the vehicle 220. As mentioned above, the processor 110 may determine the at least one estimated trajectory of the vehicle 220 in accordance with the trajectory estimation order.

It is contemplated that the processor 110 may make use of the trajectory estimation order for determining that it does not require determining estimated trajectories of the neighboring vehicles C and D for determining the at least one estimated trajectory of the vehicle 220 since, as previously alluded to, the vehicle 220 is priority independent from the neighboring vehicles C and D.

It is hence contemplated that the processor 110 may use the trajectory estimation order for determining estimated trajectories of vehicles on the section of the road map, such that (i) at least one estimated trajectory of the given vehicle is determined prior to determining at least one estimated trajectory of the another vehicle, and (ii) the at least one estimated trajectory of the another vehicle is determined based on the at least one estimated trajectory of the given vehicle.

It is also contemplated that the trajectory estimation order for a given priority-based hierarchy starts with the respective main vehicle. Also, it is contemplated that determining the at least one estimated trajectory for the vehicle 220 may comprise the processor 110 configured to generate the estimated trajectories of vehicles that are above the vehicle 220 in the trajectory estimation order associated with the vehicle 220, starting with the respective main vehicle and going down that trajectory estimation order.

In some embodiments, determining the at least one estimated trajectory for the vehicle 220 may not require determining estimated trajectories of vehicles that are not part of the same trajectory estimation order as the vehicle 220. In other embodiments, determining the at least one estimated trajectory for the vehicle 220 may not require determining estimated trajectories of vehicles that are not part of the same priority-based hierarchy as the vehicle 220. In further embodiments, determining the at least one estimated trajectory for the vehicle 220 may not require determining estimated trajectories of vehicles that are not part of the same hierarchical structure as the vehicle 220. In additional embodiments, determining the at least one estimated trajectory for the vehicle 220 may not require determining estimated trajectories of vehicles that are not part of the same graph structure as the vehicle 220.

In some embodiments, the method 600 may also comprise the processor 110 configured to use the estimated trajectories of the vehicles (as determined in accordance with the trajectory estimation order) on the section of the road map for determining the target trajectory of the vehicle 220. For example, in some instances, the processor 110 may input the estimated trajectories of the vehicles that are above the vehicle 220 in the priority-based hierarchy of the vehicle 220 and the at least one estimated trajectory of the vehicle 220 into the MLA. As described above, the MLA may be configured to employ at least the estimated trajectories as inputted by the processor 110 for outputting the target trajectory of the vehicle 220.

In some embodiments, the processor 110 may further input the kinematic data about the vehicles that are above the vehicle 220 in the priority-based hierarchy of the vehicle 220 into the MLA so that the MLA takes into account the kinematic data for outputting the target trajectory of the vehicle 220.

It is contemplated that the kinematic data may comprise at least one of: position, speed, and acceleration of the vehicles that are above the vehicle 220 in the priority-based hierarchy of the vehicle 220. For example, the kinematic data may be gathered by the sensor system 230 of the vehicle 220.

In some embodiments of the present technology, it is contemplated that at least two vehicles on the section of the road map may be autonomous vehicles. For example, a first autonomous vehicle and a second autonomous vehicle may be on the section of the road map. In some embodiments, the processor 110 of the first autonomous vehicle may be configured to transmit (and/or trigger transmission of) information indicative of the trajectory estimation order to the second autonomous vehicle. In other embodiments, the processor 110 of the first autonomous vehicle may be configured to transmit (and/or trigger transmission of) the kinematic data to the second autonomous vehicle. In further embodiments, the processor 110 of the first autonomous vehicle may be configured to transmit (and/or trigger transmission of) the object-related information to the second autonomous vehicle. In additional embodiments, the processor 110 of the first autonomous vehicle may be configured to transmit (and/or trigger transmission of) information indicative of the target trajectory of the first autonomous vehicle to the second autonomous vehicle.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of controlling operation of an autonomous vehicle including determining a trajectory estimation order for vehicles driving in surroundings of the autonomous vehicle, the autonomous vehicle being communicatively coupled to a processor, the processor having access to information indicative of:
   (i) a section of a road map corresponding to the surroundings of the autonomous vehicle, and
   (ii) road rules associated with the section of the road map, the method being executable by the processor, the method comprising:
      identifying, by the processor, pairs of vehicles, including the autonomous vehicle, on the section of the road map that have intersecting potential trajectories; and
      identifying, by the processor, vehicle priority information indicative of priorities of the vehicles, including the autonomous vehicle, on the section of the road map, the identifying comprising:
         using, by the processor, the road rules for determining which one in a respective pair of vehicles has priority over the other one in the respective pair of vehicles;
         generating, by the processor, at least one graph structure having vertices and edges,
         a given one of the at least one graph structure being a respective hierarchical structure representing a respective priority-based hierarchy between the vehicles in the section of the road map;
         a given edge connecting a pair of vertices;
         the pair of vertices being indicative of the respective pair of vehicles on the section of the road map; and
         the given edge representing which one of a first one in the respective pair of vehicles has priority over a second one in the respective pair of vehicles; and
      based on the vehicle priority information,
         determining, by the processor, a trajectory estimation order for the vehicles on the section of the road map, including the autonomous vehicle,
         such that a given vehicle having priority over another vehicle in the vehicle priority information is above another vehicle in the trajectory estimation order;
         based on the trajectory estimation order, determining, by the processor, a target trajectory for the autonomous vehicle; and
         causing, by the processor, the autonomous vehicle to move along the target trajectory.

2. The method of claim 1, wherein the determining the target trajectory for the autonomous vehicle comprises determining estimated trajectories of the vehicles on the section of the road map,
   such that:
      (i) at least one estimated trajectory of the given vehicle is determined prior to determining at least one estimated trajectory of the another vehicle; and
      (ii) the at least one estimated trajectory of the another vehicle is determined based on the at least one estimated trajectory of the given vehicle.

3. The method of claim 2, wherein the determining the target trajectory for the autonomous vehicle further comprises:
   inputting, by the processor, the estimated trajectories of the vehicles into a Machine Learned Algorithm (MLA), the MLA being configured to employ at least the estimated trajectories of the vehicles for outputting the target trajectory of the one of the vehicles.

4. The method of claim 3, wherein the MLA is further configured to employ kinematic data about at least one of the vehicles for outputting the target trajectory of the autonomous vehicle.

5. The method of claim 4, wherein the kinematic data comprises at least one of:
   a position of the at least one of the vehicles;
   a speed of the at least one of the vehicles; and
   an acceleration of the at least one of the vehicles.

6. The method of claim 4, wherein the kinematic data is gathered by a sensor system communicatively coupled to the autonomous vehicle.

7. The method of claim 1, wherein the processor further has access to information indicative of positions of the vehicles on the section of the road map.

8. The method of claim 7, wherein the information indicative of the positions is gathered by a sensor system communicatively coupled to the autonomous vehicle.

9. The method of claim 8, wherein the autonomous vehicle is equipped with the sensor system.

10. The method of claim 1, wherein the respective hierarchical structure representing the respective priority-based hierarchy between the vehicles has on top thereof a respective main vehicle, the respective main vehicle being a least affected vehicle by the vehicles in the respective priority-based hierarchy than any other vehicle in the respective priority-based hierarchy.

11. The method of claim 1, wherein the trajectory estimation order for the respective priority-based hierarchy starts with the respective main vehicle.

12. The method of claim 11, wherein the determining the target trajectory for the autonomous vehicle comprises generating at least one estimated trajectories of vehicles being above the autonomous vehicle in the order, starting with the respective main vehicle and going down the order.

13. The method of claim 12, wherein the method comprises not determining the at least one estimated trajectory for vehicles below the autonomous vehicle in the order.

14. The method of claim 1, wherein the another vehicle is another autonomous vehicle.

15. The method of claim 14, wherein the method further comprises transmitting information indicative of the trajectory estimation order to the another vehicle.

16. The method of claim 14, wherein the processor of the autonomous vehicle has access to kinematic data about at least one of the vehicles, and wherein the method further comprises transmitting the kinematic data to the another vehicle.

17. A processor for controlling operation of an autonomous vehicle including determining a trajectory estimation order for vehicles driving in surroundings of the autonomous vehicle, the autonomous vehicle being communicatively coupled to the processor, the processor having access to information indicative of:
   (i) a section of a road map corresponding to the surroundings of the autonomous vehicle, and
   (ii) road rules associated with the section of the road map, the processor being configured to:
      identify pairs of vehicles, including the autonomous vehicle, on the section of the road map that have intersecting potential trajectories;
      identify vehicle priority information indicative of priorities of the vehicles, including the autonomous vehicle, on the section of the road map, to identify vehicle priority information the processor being configured to:

use the road rules for determining which one in a respective pair of vehicles has priority over the other one in the respective pair of vehicles;

generate at least one graph structure having vertices and edges, a given one of the at least one graph structure being a respective hierarchical structure representing a respective priority-based hierarchy between the vehicles in the section of the road map;

a given edge connecting a pair of vertices;

the pair of vertices being indicative of the respective pair of vehicles on the section of the road map; and the given edge representing which one of a first one in the respective pair of vehicles has priority over a second one in the respective pair of vehicles; and based on the vehicle priority information, determine trajectory estimation order for vehicles on the section of the road map, including the autonomous vehicle, such that a given vehicle having priority over another vehicle in the vehicle priority information is above another vehicle in the trajectory estimation order;

based on the trajectory estimation order, determine a target trajectory for the autonomous vehicle; and cause the autonomous vehicle to move along the target trajectory.

\* \* \* \* \*